US005930146A

United States Patent [19]

Takenaka

[11] Patent Number: 5,930,146

[45] Date of Patent: Jul. 27, 1999

[54] DRINK DISPENSER WITH MEMORY MEANS

[75] Inventor: Katsumi Takenaka, Mie, Japan

[73] Assignee: Fuji Electric Co., Ltd,, Kawasaki, Japan

[21] Appl. No.: 08/945,258

[22] PCT Filed: Apr. 11, 1997

[86] PCT No.: PCT/JP97/01263

§ 371 Date: Oct. 20, 1997

§ 102(e) Date: Oct. 20, 1997

[87] PCT Pub. No.: WO97/38937

PCT Pub. Date: Oct. 23, 1997

[30] Foreign Application Priority Data

Apr. 12, 1996 [JP] Japan .................................. 8-090757

[51] Int. Cl.[6] .............................. G06F 17/00; G06F 7/00; G04C 1/12; G04C 23/00

[52] U.S. Cl. ................................ 364/479.03; 364/479.01; 364/479.06; 222/644; 222/641; 222/129.1; 222/63

[58] Field of Search ......................... 364/479.01, 479.06, 364/479.09, 479.02, 479.03; 222/644, 638, 641, 63, 129.1

[56] References Cited

U.S. PATENT DOCUMENTS

| | | | |
|---|---|---|---|
| 3,669,312 | 6/1972 | Kuckens et al. | 222/641 |
| 4,282,987 | 8/1981 | Thomas et al. | 222/641 |
| 4,328,539 | 5/1982 | Heeger | 364/479.02 |
| 4,409,649 | 10/1983 | Heeger | 364/479.02 |
| 4,495,584 | 1/1985 | Yoshida | 364/479.01 |
| 4,517,651 | 5/1985 | Kawasaki et al. | 364/479.09 |
| 4,800,492 | 1/1989 | Johnson et al. | 364/479.06 |
| 4,827,426 | 5/1989 | Patton et al. | 364/479.1 |
| 5,027,284 | 6/1991 | Senghaas et al. | 364/479.1 |
| 5,111,969 | 5/1992 | Knepler | 222/644 |
| 5,141,130 | 8/1992 | Wiley et al. | 222/638 |
| 5,174,472 | 12/1992 | Raque et al. | 222/644 |
| 5,361,216 | 11/1994 | Warn et al. | 364/479.06 |
| 5,601,218 | 2/1997 | Takenaka | 222/641 |

*Primary Examiner*—William E. Terrell
*Assistant Examiner*—Wonki Park
*Attorney, Agent, or Firm*—Kanesaka & Takeuchi

[57] ABSTRACT

A drink dispenser can sell or reserve a drink even during a sale of a drink, thereby ensuring the sale of drinks. Namely, if any one of drink sale buttons is pressed while any one of drink discharge valve relays is opened to sell a drink, this request for a sale is stored in a memory. Once the current sale of a drink has been completed, an interval timer starts counting down and after a specified period of time, a valve corresponding to the request for a sale stored in the memory is opened to start a sale. A plurality of drinks may be supplied simultaneously.

3 Claims, 3 Drawing Sheets

DRINK DISPENSER WITH MEMORY MEANS

FIELD OF THE INVENTION

The present invention relates to a drink dispenser that supplies a specified amount of a drink when a drink sale button is pressed.

PRIOR ART

In known drink dispensers, when a remaining amount of money with respect to an input amount of money is larger than a sale price for a single drink, a sale of a second drink can be reserved by pressing another drink sale button.

Control of the dispenser, however, is normally provided in such a way that an order for a second drink can not be accepted during a sale of a drink even if the drink sale button is pressed to reserve a sale of a second drink except for requesting a change to be returned.

This control is provided to prevent a drink from being supplied before a container for a drink has been prepared if the same type of a drink is continuously supplied. If different types of drinks are to be supplied, this control is provided because the ability to supply resources, such as a diluted solution or carbonated water, is limited.

The conventional drink dispensers have the following problems.

As described above, since a second drink can not be sold before a sale of a first drink has been completed, a user who receives the drinks must wait at the dispenser and no other operation can be performed during this period of time, resulting in a degradation of a working efficiency.

It is an object of this invention to enable another sale to be reserved even during the sale of the first drink, thereby ensuring the sale of multiple drinks.

DISCLOSURE OF THE INVENTION

This invention provides a drink dispenser for supplying a specified amount of a drink when a drink sale button is pressed, which includes memory means for storing a request for a sale of a drink; and counting means for counting a specified period of time after an end of a sale of a drink, wherein in case the drink sale button is pressed, when a drink is being sold, the request for a drink sale is stored in the memory means, and after a specified period of time has been counted by the counting means, a drink sale is started based on the stored request for the sale of the drink. This allows a sale to be reserved even during a sale of a drink, and still allows the apparatus to be ready to discharge a second drink, thereby ensuring the sale of drinks.

In addition, this invention provides a drink dispenser for supplying a specified amount of a drink when a drink sale button is pressed, which includes memory means for storing a request for a sale of a drink, wherein in case a drink sale button is pressed, when more than a specified number of multiple drinks are being sold, the request for the sale of the drink is stored in the memory means, and when the number of drinks to be sold becomes smaller than the specified number of the sale, the sale of the drink is started based on the memorized request for the sale of the drink. This allows a sale to be reserved even during the sale of a drink, and still ensures the sale of the drinks while maintaining a constraint on a plurality of sales for the dispenser.

Thus, this invention eliminates the need for a user to wait until the current sale has been finished in order to obtain a sale of a second drink, thereby improving the operability of the dispenser and the working efficiency to such an extent that a different operation can be performed during the conventional wait time.

PREFERRED EMBODIMENTS OF THE INVENTION

This invention is described in more detail with reference to the accompanying drawings.

Figure 1:
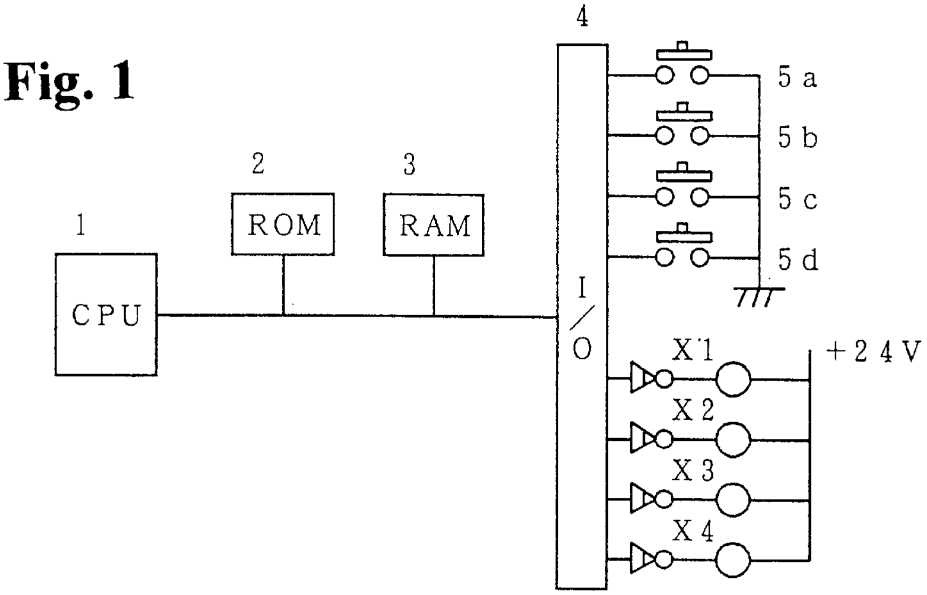
FIG. 1 is a block diagram showing one embodiment of this invention.

FIG. 1 is a block diagram showing one embodiment of this invention.

Reference numeral 1 designates a CPU for controlling the entire apparatus, 2 is ROM for storing a control program of the CPU 1, and 3 is RAM for storing various data.

In addition, the CPU 1 is connected through I/O 4 to drink sale buttons 5*a* to 5*d* so that various drinks can be selected, and drink discharge valve relays X1 to X4 for driving drink discharge valves. Moreover, a counting interval timer described below is connected to the CPU 1.

Figure 2:
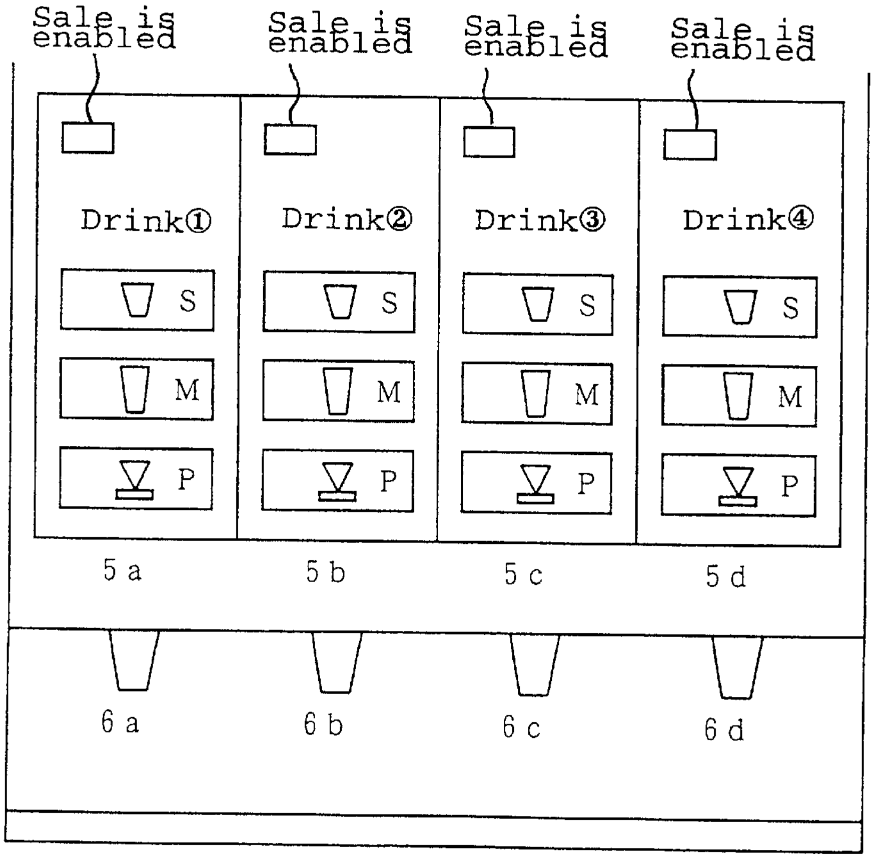
FIG. 2 is a front view of a drink dispenser.

FIG. 2 is a front view of a drink dispenser.

The drink sale buttons 5*a* to 5*d* are provided for drinks, and when one of the buttons 5*a* to 5*d* is pressed, a specified amount of a drink is discharged from a drink discharge port 6*a* to 6*d*.

Such a drink dispenser has a limit on the number of drinks that can be simultaneously discharged, and in this example, the dispenser can sell up to two types of drinks.

Next, the operation of this invention is described with reference to FIGS. 1 and 2.

(1) First Invention

Figure 3:
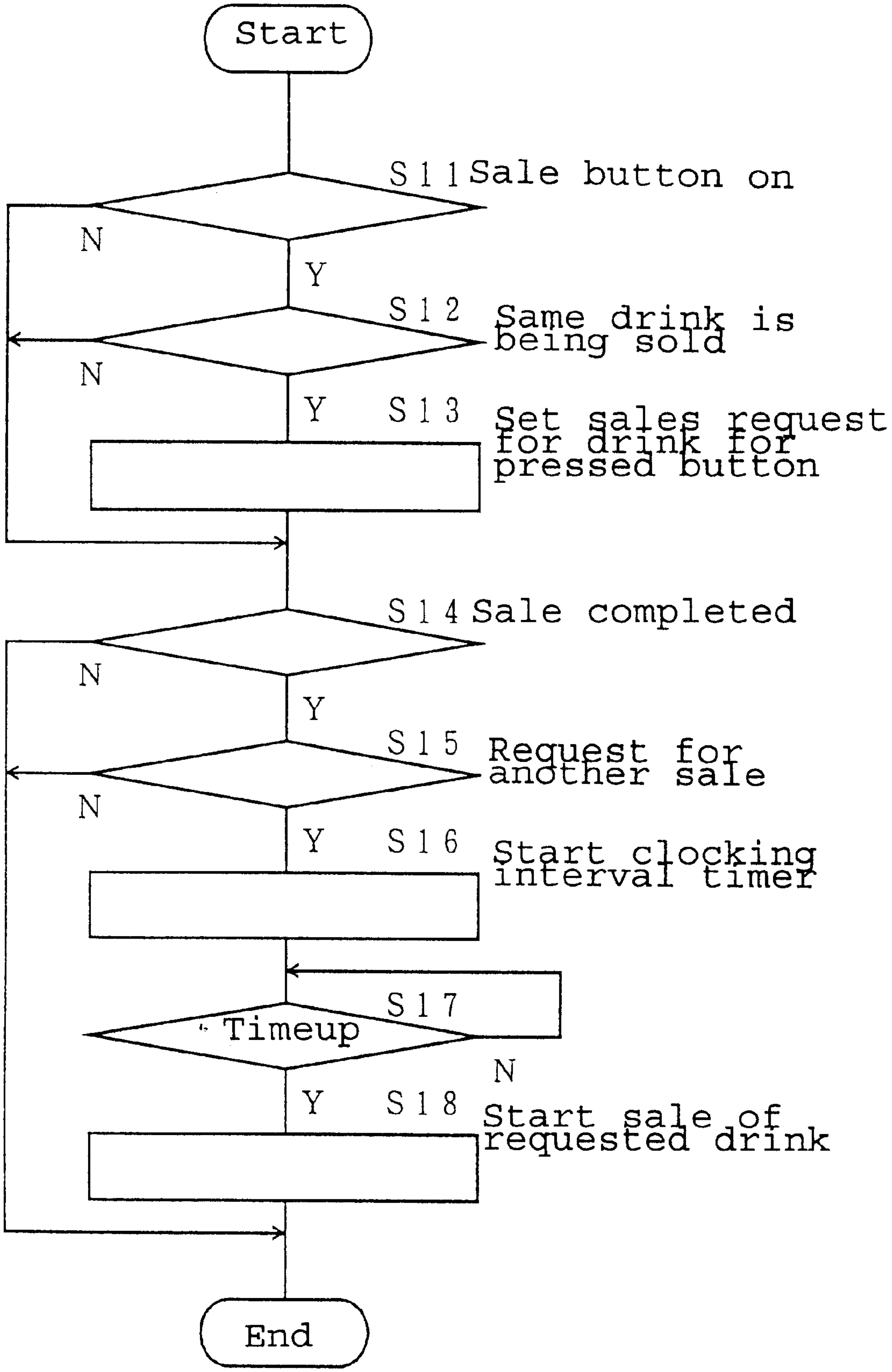
FIG. 3 is a flow chart showing an operation based on a first invention.

FIG. 3 is a flow chart showing the operation of the main part of the first invention.

First, the CPU 1 determines whether any one of the drink sale buttons 5*a* to 5*d* has been pressed (step S11). If so (branch Y), the CPU 1 determines whether a drink corresponding to the pressed drink sale button is being sold (step S12). If so (branch Y), the CPU 1 permits the request for the sale of the drink to be stored in RAM 3 (step S13) and proceeds to step S14. If none of the drink sale buttons 5*a* to 5*d* have been pressed at the step S11 (branch N) or the drink is not being sold at the step S12 (branch N), the CPU 1 proceeds to the step S14.

At the step S14, the CPU 1 determines whether the sale of the drink being sold has been completed. If so (branch Y), the CPU 1 refers to the data stored in RAM 3 to determine whether there is another request for a drink (step S15). If so (branch Y), the CPU 1 actuates the interval timer to start running (step S16) and proceeds to step S17. The interval timer is used to count a time required to change the container for the next discharge of a drink. The step 17 waits for the interval timer to run out, and after running out of the time (branch Y), it starts to sell a requested drink in order to complete the series of operations.

If the sale has not been completed at the step S14 (branch N) or if there has been no request for another sale (branch N), the process is immediately ended. If, during a sale of a drink, a sale of the same type of drink is requested, it is possible to immediately reserve the sale of that drink. In addition, the container can be changed before the discharge of the drink is started, thereby ensuring the sale of the drink.

(2) Second Invention

Figure 4:
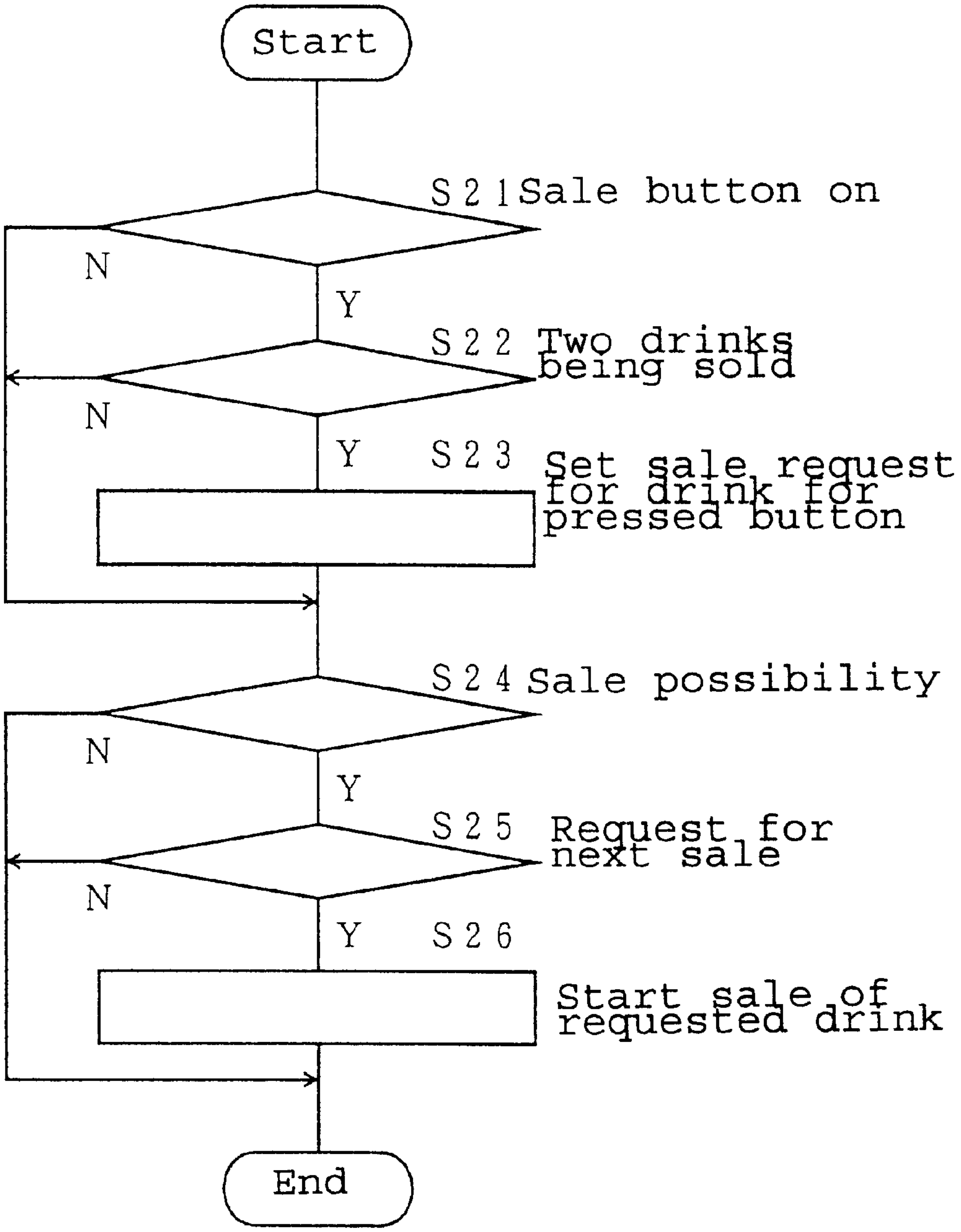
FIG. 4 is a flow chart showing an operation based on a second invention.

FIG. 4 is a flow chart showing a main part of the second invention.

First, the CPU 1 determines whether any one of the drink sale buttons 5*a* to 5*d* has been pressed (step S21). If so (branch Y), the CPU 1 determines whether drinks corresponding to two drink sale buttons are being sold (step S22). If so (branch Y), the CPU 1 permits the request for the sale of the drink corresponding to the pressed drink sale button to be stored in RAM 3 (step S23) and proceeds to step S24.

If no sale button has been pressed at the step S21 (branch N) or if no drink or only one drink is being sold at the step S22, the CPU 1 immediately proceeds to the step S24. At the step S24, the CPU 1 determines whether at least one of the two drinks being sold at the step S22 has been completed to enable a subsequent sale. If so (branch Y), the CPU 1 refers to the data in RAM 3 to determine whether there is another request for a sale of a drink (step S25). If so (branch Y), the drink request that has been stored at the step S23 is started (step S26) in order to complete the series of operations.

If the sale is not possible at the step S24 (branch N) or there is no request for the sale of a drink, the process is immediately ended.

These operations enable another drink sale to be reserved even during the sales of the drinks while maintaining a constraint on the simultaneous drink sales of the dispenser described above (in this example, two drinks), thereby ensuring the sale of the drinks.

Industrial Applicability

As described above, the drink dispenser according to this invention is suitable to supply a specified amount of drink to a container when the drink sale button is pressed.

What is claimed is:

1. A drink dispenser for supplying a specified amount of a drink, comprising:

a plurality of drink sale buttons for providing drinks;

memory means for storing a request for a sale of a drink electrically connected to the drink sale buttons, said memory means storing, in case one of the drink sale buttons is pressed when a drink is being sold, a request for a sale of the drink; and means for counting a specified period of time connected to memory means, said counting means starting to count the specified period of time after completion of sale of the drink being sold in case the request for the sale of the drink is stored in the memory means so that in case a drink is being sold, sale of a next drink is requested while providing a sufficient time from the drink being sold to the next drink.

2. A drink dispenser according to claim 1, further comprising a computer connected to the drink sale buttons, memory means and counting means, said computer actuating the counting means only when said memory means has the request for the sale of the drink therein.

3. A drink dispenser according to claim 1, wherein said counting means provides time to change a container from the drink being sold to the next drink.

* * * * *